Aug. 3, 1965   R. J. CLANCY ETAL   3,197,935
TRIM MOLDING FASTENER
Filed Oct. 5, 1961
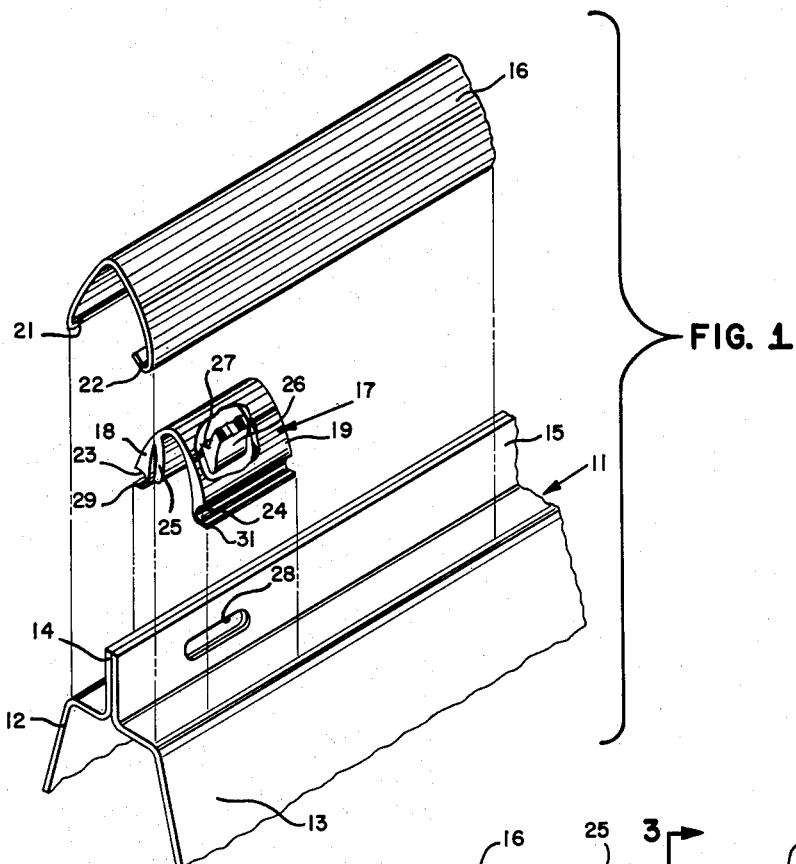
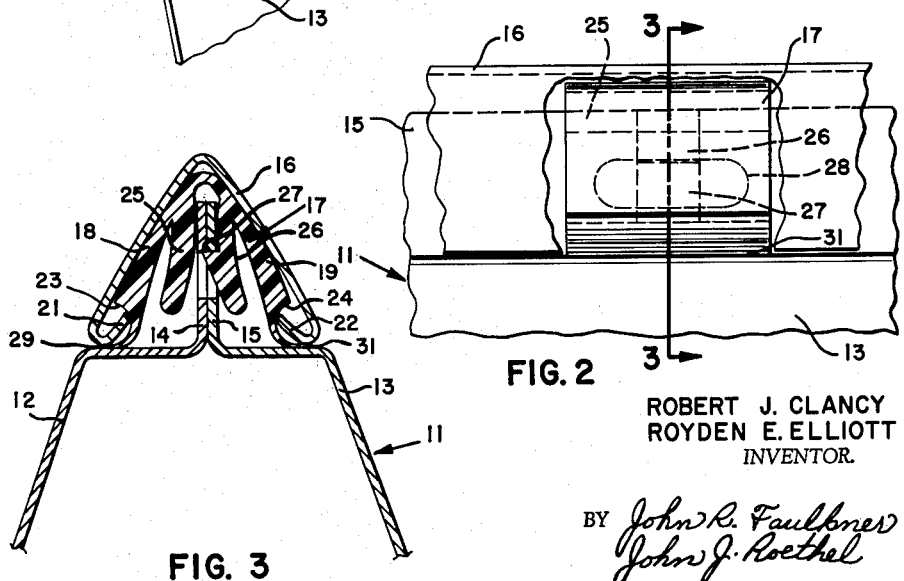
ROBERT J. CLANCY
ROYDEN E. ELLIOTT
INVENTOR.
BY John R. Faulkner
John J. Roethel
ATTORNEYS

United States Patent Office 3,197,935
Patented Aug. 3, 1965

3,197,935
TRIM MOLDING FASTENER
Robert J. Clancy, Birmingham, and Royden E. Elliott, Royal Oak, Mich., assignors to Ford Motor Company, Dearborn, Mich., a corporation of Delaware
Filed Oct. 5, 1961, Ser. No. 143,244
2 Claims. (Cl. 52—718)

This invention relates to a molded one piece fastener for securing a trim molding strip to a pinchweld flange of a motor vehicle body.

Frequently, in the construction of motor vehicle bodies, the spot welded juncture of adjacent sheet metal sections forms an exposed outstanding flange commonly known as a pinchweld flange. For aesthetic reasons, it is desirable to conceal this exposed flange with a decorative trim molding strip. The trim molding strip is secured to the vehicle body by a plurality of clips or fasteners.

The most common types of fasteners utilized are formed from sheet metal. The fasteners are generally preassembled to the trim molding strip and the strip and fastener assembly is then secured to the flange of the body. The fasteners generally have serrated edges which bear against the body flange to prevent the trim molding strip from becoming dislodged. During assembly, the serrated edges of the fastener frequently scratch the corrosion resistant coating from the sheet metal. The unprotected metal eventually corrodes causing rust streaks to appear on the adjacent painted area.

It is an object of this invention to provide a trim molding fastener that will rigidly secure the trim molding to the vehicle body structure without removing the protective coating of the body.

The single piece fastener embodying the instant invention is molded from a non-metallic material. It has a body portion having an outer cross sectional contour that is substantially complementary to the inner cross sectional contour of the trim molding strip. A pair of legs extend inwardly from the body portion and are adapted to grip the body flange and hold the molding strip thereon.

Further objects and advantages of this invention will become more apparent as this description proceeds particularly when considered in conjunction with the accompanying drawings, wherein:

FIGURE 1 is an exploded view of a portion of a vehicle body incorporating the instant invention with a portion of the fastener cut away to more clearly show the construction.

FIGURE 2 is a side elevational view of the construction shown in FIGURE 1 in the assembled position.

FIGURE 3 is a cross sectional view taken along line 3—3 of FIGURE 2.

Referring now in detail to the drawings, there is shown generally at 11 a portion of a motor vehicle body structure composed of adjacent sheet metal sections 12 and 13. The sheet metal sections 12 and 13 have abutting upstanding flange portions 14 and 15, respectively. The flange portions 14 and 15 are secured to each other along their length by spot welding.

The exposed pinchweld flange formed by the union of the flange portions 14 and 15 is concealed by a trim molding strip 16 having a substantially V-shaped cross sectional contour. A plurality of molded fasteners 17 (only one of which is shown) are spaced along the length of the trim molding strip 16 to secure the trim molding strip 16 to the flange portions 14 and 15.

The fastener 17 has a body portion having a substantially V-shaped cross sectional contour formed by intersecting outer legs 18 and 19. The outer cross sectional contour of the legs 18 and 19 is substantially complementary to the inner cross sectional contour of the trim molding strip 16. The surface of the legs 18 and 19 is slightly arcuate being formed with a relatively large radius of curvature. The legs 18 and 19 thereby curve gradually inwardly toward a plane bisecting the body portion of the fastener 17. The fastener 17 is molded with the outer legs 18 and 19 in a slightly open or expanded condition whereby they will be compressed upon insertion into the trim molding strip 16.

The trim molding strip 16 has inturned flanges 21 and 22 which extend into longitudinal indentations 23 and 24 formed in the outer legs 18 and 19, respectively. The co-action of the inturned flanges 21 and 22 with the indentations 23 and 24 and the compressive resistance of the outer legs 18 and 19 rigidly secure the fastener 17 to the trim molding strip 16.

A pair of inner legs 25 and 26 extend from an area contiguous to the bight of the outer legs 18 and 19 on each side of the plane bisecting the body portion. The inner legs 25 and 26 are slightly arcuate and curve gradually away from the bisecting plane. The enlarged opening thus formed is adapted to receive the body flange portions 14 and 15. Upon insertion of the flange portions 14 and 15 therebetween, the inner legs 25 and 26 are caused to spread and grip the flange portions 14 and 15. The exposed ends of the inner legs 25 and 26 are rounded to lessen the possibility of scratching the protective coating from the body 11 during assembly.

The inner leg 26 is of lesser length than the remaining legs and has a projection 27 formed thereon which is adapted to extend through aperture 28 formed in flange portions 14 and 15. The inner leg 25 is co-extensive with the outer legs 18 and 19 and bears against the flange portion 14 to maintain the projection 27 within the aperture 28 and, thus, rigidly secure the trim molding strip 16 and the fastener 17 to the vehicle body 11.

Because the fastener 17 has no sharp corners that can contact the sheet metal sections 12 and 13, there is little likelihood of removal of the protective coating of these surfaces during installation of the trim molding strip 16. To further reduce the possibility of scratching, the fastener 17 is formed of a non-metallic or plastic material such as nylon. Additional protection is afforded by the projections 29 and 31 formed adjacent the indentations 23 and 24 of the outer legs 18 and 19. The projections 29 and 31 are substantially normal to the plane bisecting the body of the fastener 17 and are interposed between the trim molding strip 16 and the adjacent sheet metal sections 12 and 13. The fastener 17 thereby secures the trim molding strip 16 to the vehicle body 11 while preventing metal on metal contact.

It is to be understood that the invention is not to be limited to the exact construction shown and described but that various changes and modifications may be made without departing from the spirit and scope of the invention, as defined by the appended claims.

We claim:
1. In combination
   a hollow trim molding strip of inverted substantially V-shaped contour,
   a motor vehicle body having an outstanding pinch weld flange,
   and a non-metallic fastener contained within and securing said trim molding strip to said pinch weld flange;
   said fastener having a first pair of leg portions with an outer cross sectional contour resiliently conformed substantially complementarily to the inner cross sectional contour of said molding strip,
   inturned flange means on said molding strip engaged with terminal end portions of said first pair of leg portions preventing withdrawal of said fastener from said molding strip, said fastener having a second pair of leg portions interposed between said first pair of leg portions with the major portion of each of said second pair of leg portions being spaced from the respective adjacent one of said first pair of leg portions for flexure independently thereof, said second pair of leg portions resiliently straddling said pinch weld flange, said pinch weld flange having an aperture therein and at least one of said second pair of leg portions having a part thereof projecting laterally through said aperture and interlocking said fastener to said flange thereby holding said molding strip on said body.

2. In combination, a hollow trim molding strip of inverted substantially V-shaped contour, a motor vehicle body having an outstanding pinch weld flange, and a non-metallic fastener contained within and securing said trim molding strip to said pinch weld flange, said fastener comprising a body portion having a first pair of intersecting leg portions coextensive with each other and curving gradually inwardly toward a plane bisecting said body portion, the external contour of said first pair of leg portions being resiliently conformed substantially complementarily to the inner cross sectional contour of said molding strip, each of said first leg portions having a longitudinally extending indentation near the terminal edge thereof, inturned flange means on said molding strip engaged with said indentations preventing withdrawal of said fastener from said molding strip, said fastener having a second pair of leg portions interposed between said first pair of leg portions, said second pair of leg portions divergently extending from an area contiguous to the bight of said body portion with the major portion of each of said second pair of leg portions being spaced from the respective adjacent one of said first pair of leg portions for flexure toward and independently thereof, said second pair of leg portions resiliently straddling said pinch weld flange, said pinch weld flange having an aperture therein and at least one of said second pair of leg portions having a part thereof projecting laterally through said aperture and interlocking said fastener to said flange thereby holding said molding strip on said body.

References Cited by the Examiner

UNITED STATES PATENTS

| 2,216,047 | 9/40 | Place | 189—88 |
| 2,984,877 | 5/61 | Perrochat | 24—73 |
| 3,004,643 | 10/61 | MacCallum | 189—88 |
| 3,037,595 | 6/62 | Meyer | 189—88 |
| 3,120,884 | 2/64 | Cochran | 189—88 |
| 3,127,965 | 4/64 | Weisenberger | 189—88 |

RICHARD W. COOKE, JR., *Primary Examiner.*

EARL J. WITMER, JOEL REZNEK, *Examiners.*